(12) United States Patent
Bernath

(10) Patent No.: US 12,519,828 B2
(45) Date of Patent: Jan. 6, 2026

(54) MITIGATING DDOS ATTACKS ON INTERNET PROTOCOL NETWORKS

(71) Applicant: Inception Security Solutions Inc., Sheridan, WY (US)

(72) Inventor: Tracey Bernath, Castle Rock, CO (US)

(73) Assignee: Inception Security Solutions LLC, Castle Rock, CO (US)

(*) Notice: Subject to any disclaimer, the term of this patent is extended or adjusted under 35 U.S.C. 154(b) by 0 days.

(21) Appl. No.: 19/224,345

(22) Filed: May 30, 2025

(65) Prior Publication Data

US 2025/0317473 A1    Oct. 9, 2025

Related U.S. Application Data

(63) Continuation-in-part of application No. 18/626,273, filed on Apr. 3, 2024.

(60) Provisional application No. 63/456,533, filed on Apr. 3, 2023.

(51) Int. Cl.
*H04L 9/40* (2022.01)
*H04L 9/06* (2006.01)
*H04L 9/32* (2006.01)

(52) U.S. Cl.
CPC ........ *H04L 63/1458* (2013.01); *H04L 9/0643* (2013.01); *H04L 9/32* (2013.01)

(58) Field of Classification Search
CPC ...... H04L 63/1458; H04L 9/0643; H04L 9/32
See application file for complete search history.

(56) References Cited

U.S. PATENT DOCUMENTS

| | | | |
|---|---|---|---|
| 12,301,614 B1* | 5/2025 | Payne | H04L 63/1491 |
| 2007/0248085 A1* | 10/2007 | Volpano | H04L 63/0272 370/389 |
| 2016/0210578 A1* | 7/2016 | Raleigh | H04W 28/0215 |
| 2019/0104151 A1* | 4/2019 | Cheng | H04L 63/1425 |
| 2021/0400081 A1* | 12/2021 | van der Mandele | H04L 63/1408 |
| 2023/0028892 A1* | 1/2023 | Rouvinen | H04L 63/1458 |
| 2023/0412701 A1* | 12/2023 | Pilkauskas | H04L 61/4511 |

* cited by examiner

*Primary Examiner* — Taghi T Arani
*Assistant Examiner* — Blake I Narramore
(74) *Attorney, Agent, or Firm* — Marin Patents LLC; Gustavo Marin

(57) ABSTRACT

Disclosed here are systems and methods for optimized resource availability. In some variants a proxy gateway is configured among the resource and a source and wherein the proxy gateway announces an IP subnet. The proxy gateway receives an IP packet from the source wherein the proxy gateway provides to the IP packet a selective access to the resource. In some variants a mapping associates (at least) the resource with the IP packet or other network traffic destined to the IP subnet. Alternatively or additionally a hash result may be generated by encrypting or otherwise transforming a secret or a digital identifier of the source (or both) wherein an expression of several bits of the hash result is installed into a temporarily repurposed bit set of the IP packet.

20 Claims, 10 Drawing Sheets

MITIGATING DDOS ATTACKS ON INTERNET PROTOCOL NETWORKS

RELATED APPLICATIONS

This application is a continuation-in-part of U.S. patent application Ser. No. 18/626,273 (titled "SYSTEMS AND METHODS FOR MITIGATING DDOS ATTACKS ON INTERNET PROTOCOL NETWORKS") filed on 3 Apr. 2024 which is a continuation of U.S. provisional application 63/456,533 (titled "SYSTEM AND METHOD FOR MITIGATING DDOS ATTACKS ON INTERNAL PROTOCOL NETWORKS") filed on 3 Apr. 2023. These are incorporated herein by reference to the extent not inconsistent herewith.

FIELD

The disclosure relates to the field of internet protocol (IP) technologies, and more particularly relates to traffic redirection mechanisms to protect digital resources from distributed attacks.

BACKGROUND

Devices within the internet are uniquely identified by their IP address, either IPv4 or IPv6 addresses. Packets are routed by providing a more specific subnet of traffic and the gateway IP that processes them. Each routing point maintains its routing table of subnets and 'next hops'. Public internets are routed typically by at least an IPV4/24 (i.e., 24 fixed bits, 8 bits variable) or IPV6/48 (i.e., 48 fixed bits, 64 variable).

Generally, services (server/resources) on the internet are accessed via a universal record locator (URL) which typically consists of a protocol and a string of names, in reverse hierarchical order. For example, "HTTP://WWW.CNN.COM" represents a request (via HTTP protocol) to the site 'www.cnn.com', where the 'top-level domain' (i.e.: ".com") uses registrars to assign sub-domains to entities, recursively. Applications receive and send traffic on a server by listening and talking on specific ports, which for the most common protocols (TCP, UDP) are 16 bits (65535 values).

A common issue today is that bad actors can attack these internet services. For example, attackers may manipulate HTTP, GET, POST, and other unwanted HTTP requests to attack or overload, a victim server, service, or application resources. These attacks are often executed by an attack tool or tools designed to generate and send floods of "legitimate-looking" HTTP requests to the victim server. The content of such requests might be randomized, or pseudo-randomized, to emulate legitimate WEB client behavior and evade anti-DoS mitigation elements. Attacks are prevalent because the internet was designed to be open, and accessible, and historically focuses on how to find services, not how to protect services. Further, attacks are made easy by the fact that each service runs on a small number of servers, and those servers are resolved to a fixed known IP address and typically use only one, or a small range of ports for their applications. These attacks are referred to as Distributed Denial of Service (DDOS) attacks and are designed to overload network infrastructure, servers, or online applications and bring them down. Some attacks are very high volume, consuming all available bandwidth, while others use high-packet rates to exhaust and overwhelm firewall, or server resources. The result may be slow response times, or no response at all, preventing customers from using a website, online application, or service. These attacks target organizations of all types, large and small.

DDOS attacks can be somewhat mitigated with "Anycast" networking since attacking traffic may be routed to the 'closest' data center announcing that address and attack traffic may be divided between multiple data centers. However, attacking traffic must still be processed and filtered either by the application or the use of a firewall or other security device, something that consumes expensive resources. This costs additional money, and if the attack is large enough and focused enough, can still disrupt the service. Further, existing DDOS detection and mitigation mechanisms such as rate-liming, filtering, trend observation, threshold detection, detection and rerouting, and black holing of traffic may not always be successful in identifying and blocking malicious attacks effectively, or in a timely manner.

Hence, there is a need for cost-effective systems and methods for protecting network resources from DDOS attacks and other access-inhibiting events.

PARTIAL SUMMARY OF THE DISCLOSURE

Some systems and methods as described herein relate to a proxy gateway between or otherwise among a source and a digital resource wherein the proxy gateway announces an IP subnet and receives a first IP packet from the source, wherein several bits of a hash result are installed into a bit set of the first IP packet but not to all IP packets, and wherein the proxy gateway provides access to the digital resource to the first IP packet but not to IP packets that don't include such hash result bits. This can occur, for example, in a context in which the hash result was generated by encrypting a secret and a digital identifier of the source and in which a mapping to the digital resource is shared by (at least) a redirect protocol and the proxy gateway.

Some variants described herein relate to a method, computer program product, or other modality by a mapping is established that associates a resource with (at least some) network traffic addressed directly to or otherwise destined to an IP subnet and by which a proxy gateway receives a particular IP packet thereof. A hash result is directly or otherwise obtained as an encryption or other transformation of data that includes a digital identifier of a source of the IP packet wherein one or more bits of the hash result are directly or indirectly compared with a corresponding bit set of the IP packet as a mode of validation. The proxy gateway responds conditionally to a matching compare result and by giving the IP packet access to the resource, such as by modifying part of the bit set of the IP packet so as to cause the IP packet to be redirected to the resource.

The foregoing summary is illustrative only and is not intended to be in any way limiting. Features from any of the disclosed embodiments can be used in combination with one another, without limitation.

DETAILED DESCRIPTION

Figure 1:
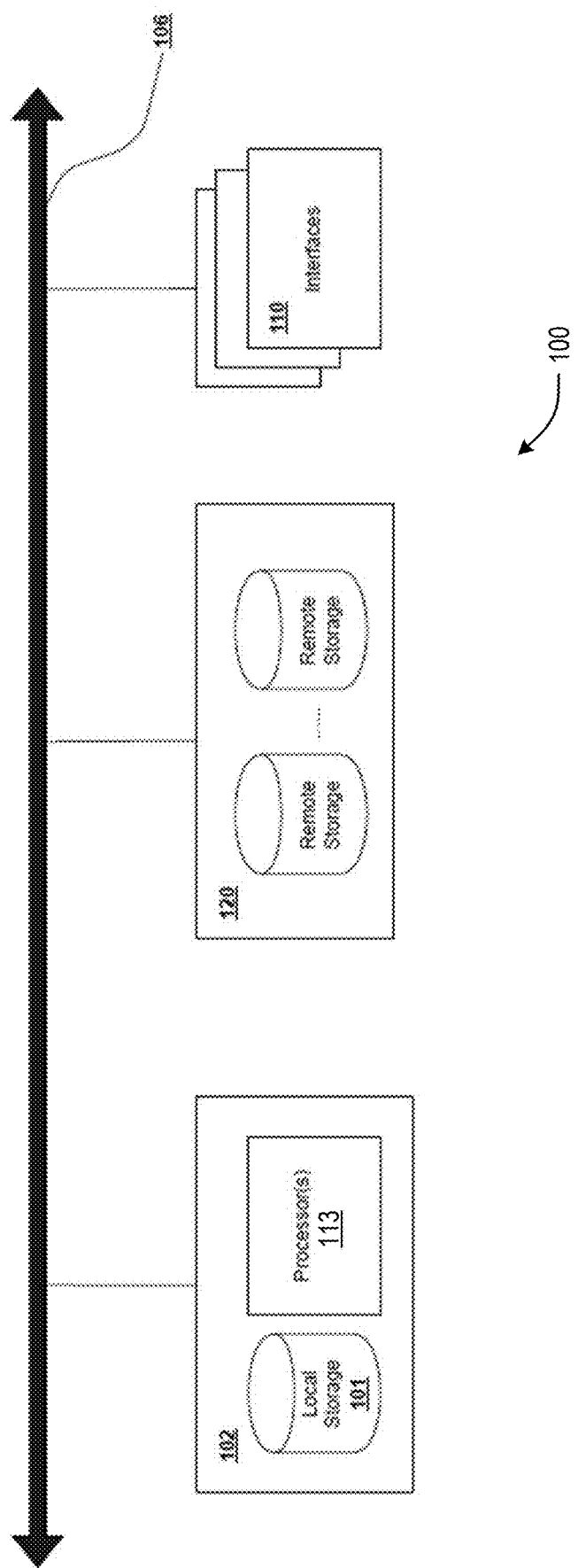
FIG. 1 is a block diagram illustrating an exemplary hardware architecture of a computing device that may include or facilitate one or more technologies described herein.

The inventor has conceived, and reduced to practice, systems and methods to protect resources from DDOS attacks and other access-inhibiting events. In some variants a proxy gateway 506 hides a server or other resource using IP subnet addressing and receives authenticated IP packets. A checksum or other security hash is generated and destination IP packets address/ports are encrypted using a secret, protocol, client IP address, resource IP address, port, or combination of these. The cryptographic hash and destination server are mapped into existing IP packet addresses, ports, or payload bits. The IP packets are routed to a redirect node in the public IP subnet of the proxy gateway 506. At the redirected node, the cryptographic hash is validated and the resource IP address and the port are extracted from mapping. Redirect node maps the clients public IP/port to an internal IP address and port associated with the resource, and tunnels the IP packets from the redirect node to the resource using the internal IP address and port.

One or more different inventions may be described in the present application. Further, for one or more of the inventions described herein, many variant embodiments may be described; it should be appreciated that these are presented for illustrative purposes only and are not limiting of the inventions contained herein or the claims presented herein in any way. One or more of the inventions may be widely applicable to many embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical, and other changes may be made without departing from the scope of the particular inventions. Accordingly, one skilled in the art will recognize that one or more of the inventions may be practiced with various modifications and alterations.

Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in one or more embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and to fully illustrate one or more aspects of the inventions. Similarly, although process steps, method steps, protocols or the like may be described in sequential order, such processes, methods, and protocols may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions(s), and does not imply that the illustrated process is preferred. Also, steps are generally described once per embodiment, but this does not mean they must occur once, or that they may only occur once each time a process, method, or protocol is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that few embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "after," "announced," "authenticated," "automatic," "borne," "caused," "conditional," "configured," "encrypted," "first," "hashing," "herein," "incoming," "ineffectual," "installed," "internal," "known-offset," "nonvolatile," "of," "programmatic," "proxied," "redirected," "rendered," "selective," "shared," "substitution," "tangible," "to," "transistor-based," "valid," "via," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than two dozen unless context dictates otherwise. "Immediate" as used herein refers to having a duration of less than 5 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon. "Instances" of an item may or may not be identical or similar to each other, as used herein.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. In the context of IP networks "public" refers to a port or IP address that is globally unique and directly accessible over the internet, meaning it can be used to communicate with devices on other networks. A "public" subnet refers to one or more ranges of IP addresses assigned by a governing body that are directly accessible from the internet, meaning devices within that subnet can generally communicate with the public internet without needing a special translation mechanism like a NAT (Network Address Translation). Some network objects are described herein as "internal," moreover, signaling that that may be private, blocked, scrambled, repurposed, semi-private, or otherwise in need of a NAT or other non-universal access mode, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In some embodiments, additional devices, or combinations of illustrated devices, may be added to, or combined, without limiting the scope to the embodiments disclosed herein.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session metadata or other informational data identified herein may be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), FPGA, or on a network interface card. Further, they can be implemented directly on network router or switch using P4 or similar programming.

Software/hardware hybrid implementations of at least some of the embodiments disclosed herein may be implemented on a programmable network-resident machine (which should be understood to include intermittently connected network-aware machines) selectively activated or reconfigured by programming instructions stored in memory of a computer. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more specifically designed computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software-or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local storage 101 and/or remote storage 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 113 such as, for example, a processor from one of the Intel, ARM, Qualcomm, and AMD families of microprocessors. In some embodiments, processors 113 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many ways in which memory may be coupled to device 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In some variants interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, InfiniBand, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 113 may be used, and such processors 113 may be present in a single device or distributed among any number of devices. In one embodiment, a single processor 113 handles communications as well as routing computations, while in other embodiments a separate dedicated communications processor may be provided. In various embodiments, different types of features or functionalities may be implemented in a system according to the invention that includes a source (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid-state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
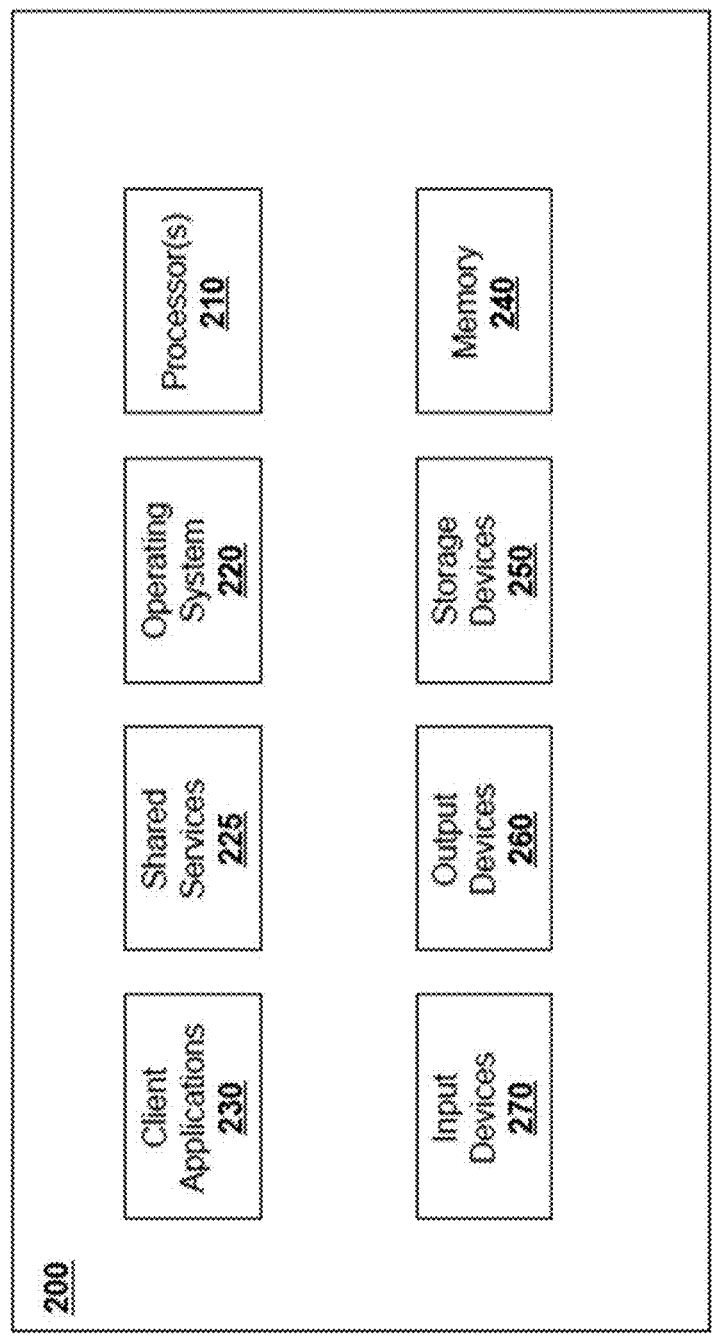
FIG. 2 is a block diagram illustrating an exemplary logical architecture for a source that may include or facilitate one or more technologies described herein, optionally configured to interact with the device of FIG. 1.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as, for example, a client application 230. Processors 210 may carry out computing instructions under the control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Shared services 225 may for example be WINDOWS™ services, user-space common services in a Linux environment, or any other type of common service architecture used with operating system 220. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
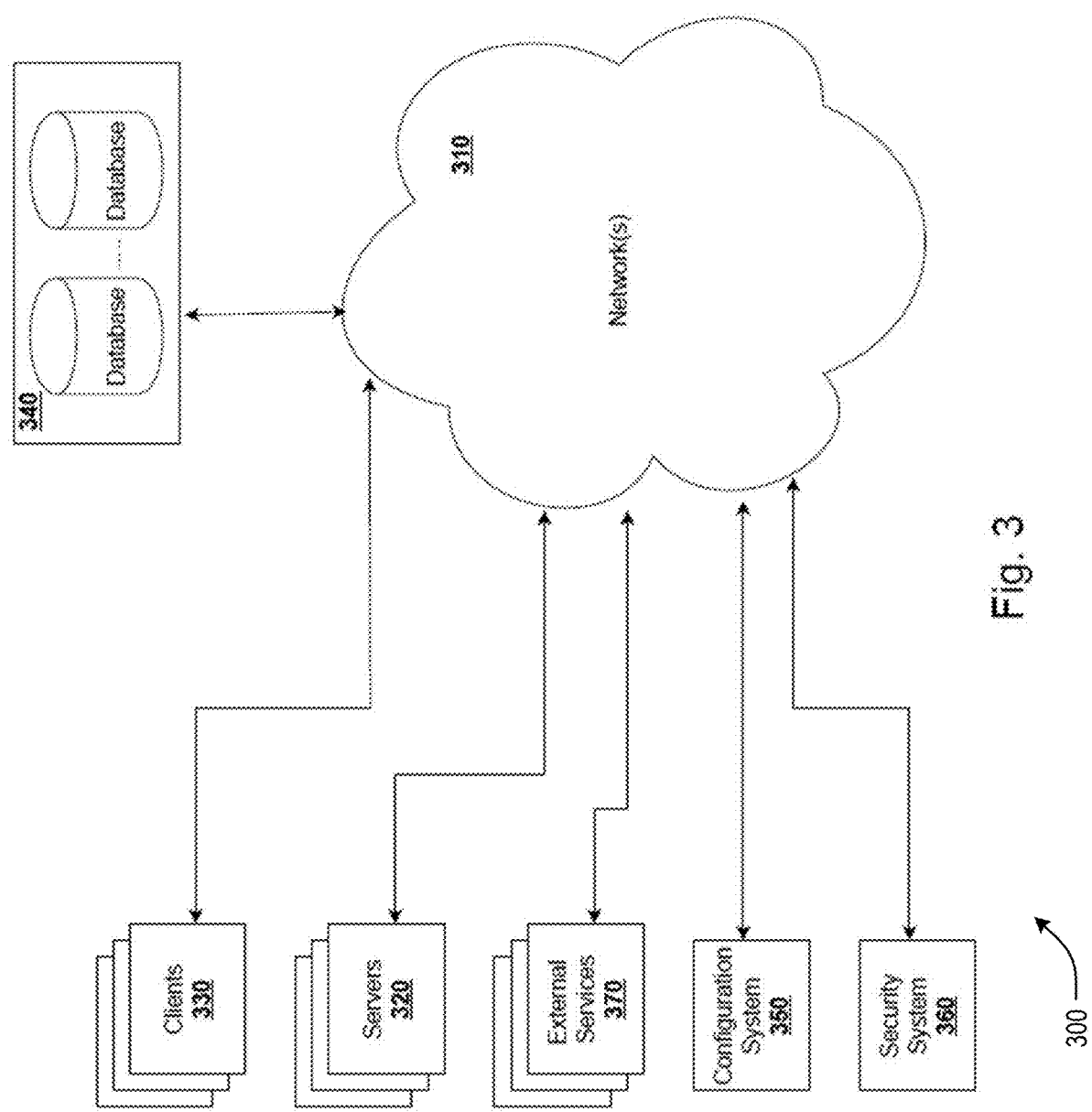
FIG. 3 is a block diagram showing an exemplary architectural arrangement of clients, servers, external services.

In some embodiments, systems of the present invention may be implemented on a distributed computing network, such as one having any number of clients and/or servers. Referring now to FIG. 3, there is shown a block diagram depicting an exemplary architecture for implementing at least a portion of a system 300 according to one or more variants of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in variants where client applications 230 are implemented on a smartphone or other electronic device, client applications 230 may obtain information stored in a server system 320 in the cloud or on an external service 370 deployed on one or more of a particular enterprises or user's premise.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments, one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security or configuration system 350, 360 or approach is specifically required by the description of any specific embodiment.

Figure 4:
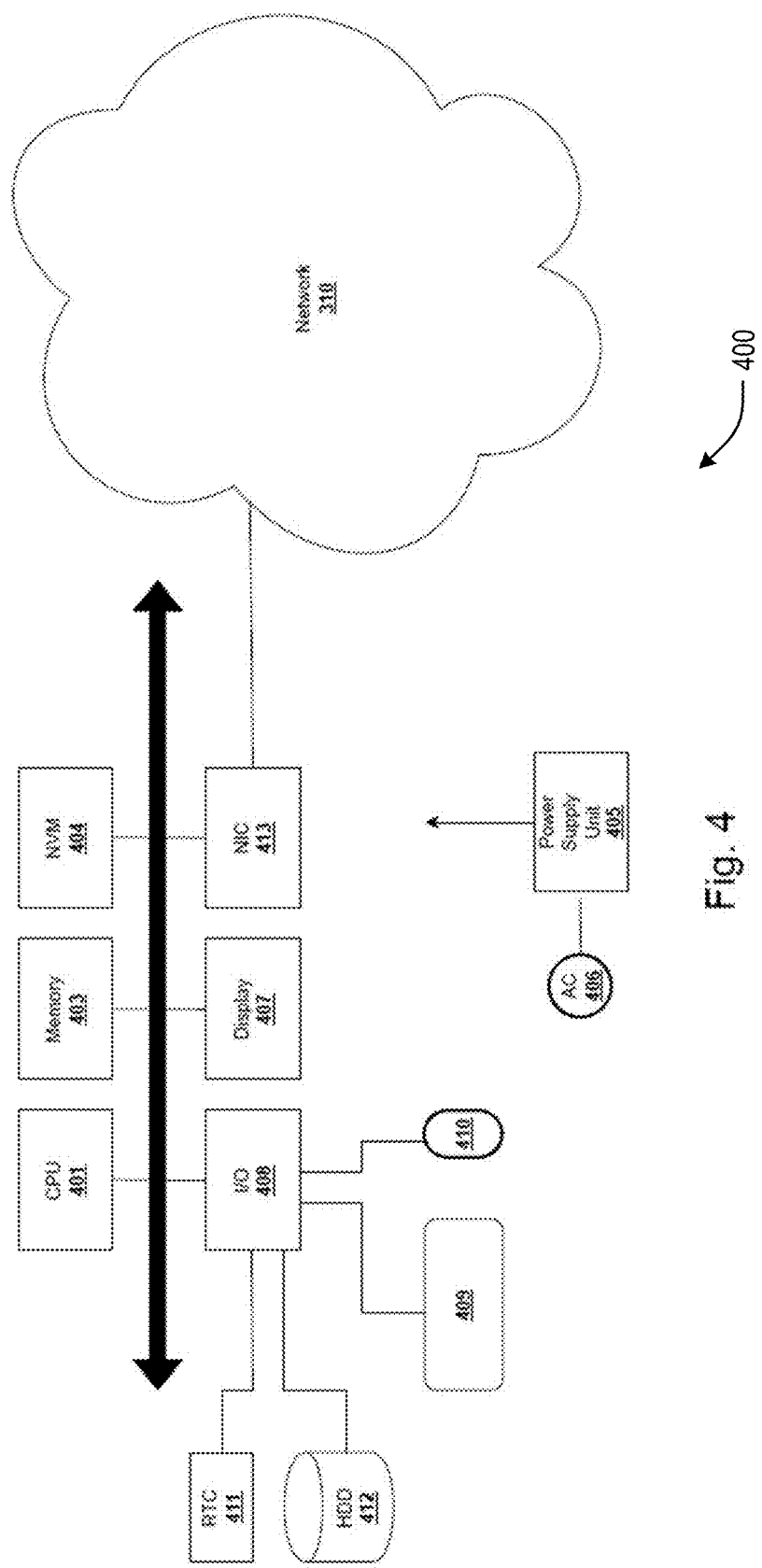
FIG. 4 is another block diagram illustrating an exemplary hardware architecture of a computing device that may interact with or otherwise facilitate one or more technologies described herein, optionally configured to instantiate the device of FIG. 1 or 2.

FIG. 4 shows an exemplary overview of a computer device 400 as may be used in any of the various locations throughout systems described herein. It is exemplary of any computer that may execute code or otherwise handle data as described herein. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 310, which may be the Internet or a local network, which local network may or may not have connections to the Internet. Also shown as part of system 400 is power supply unit 405 connected, in this example, to AC supply 406. Not shown are batteries that could be present, and many other devices and modifications that are well known but do not apply to the specific novel functions of the current system and method disclosed herein.

It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
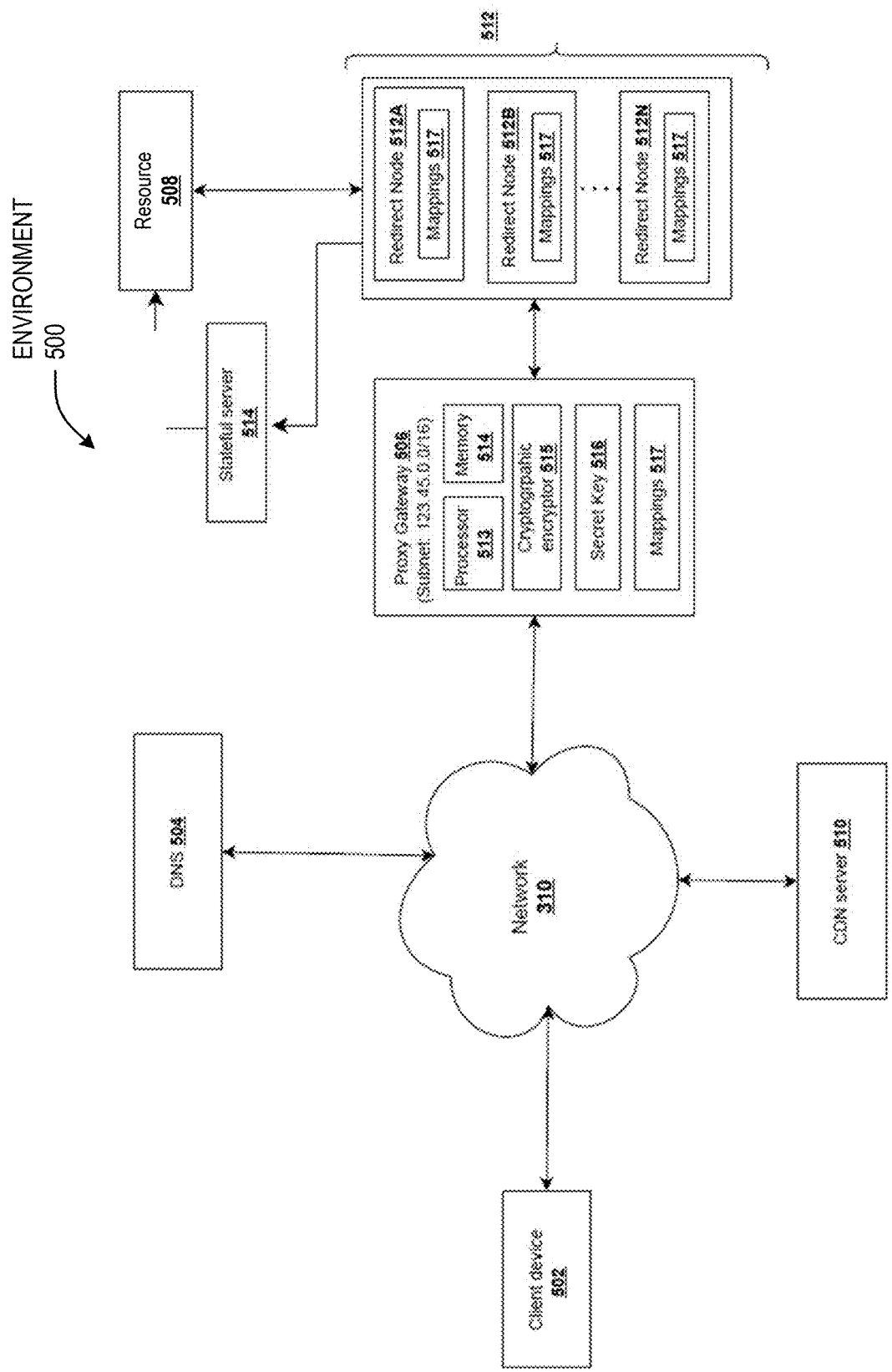
FIG. 5 is a block diagram of a computing system or other environment for encrypted redirection of IP traffic to a server or other resource (directly or otherwise) connected to a network that may be protected by or otherwise interact with one or more technologies described herein.

FIG. 5 is a block diagram of a computing environment 500 for encrypted redirection of IP traffic to a network-connected resource 508, according to some variants of the invention. HTTP requests from a client device 502 or other request source reach a Content Delivery Network (CDN) 510 that performs dynamic request routing using the Internet's Domain Name System (DNS) server 504.

DNS server 504 may be a distributed directory whose primary role may be to map fully qualified domain names to IP addresses. To determine the IP address, a request source sends a request to DNS server 504. In response, the source may receive a CDN-based address to retrieve the landing page/authentication code. CDN server 504 initiates the authentication of the source. CDN server 510 may authenticate the source using tokens, cookies, auth exchange, and client certificates. During operation, successful authentication results in the redirection of traffic from the source to proxy gateway 506.

In some variants proxy gateway 506 may be a router that accepts an entire IP subnet of traffic. The IP subnet may be announced to the public. IP traffic may be routed via IPv4 or IPV6. In the case of IPV4, an entire subnet may be announced, which for IPV4must be at least/24 (256 IP addresses) and for IPV6/48 (2{circumflex over ( )}80 IP addresses). In the case of IPV4, with IP subnet addressing 256 servers (redirect nodes) may be announced to accept encrypted IP packets. In some cases, proxy gateway 506 may configure multiple servers using Equal-cost multi-path routing (ECMP) with identical IP addresses to route IP traffic to the resource 508. This IP address subnetting can help in protecting resource 508 from DDOS attacks or similar performance-degrading impairments. The use of subnet mappings means that traffic can be steered through protocols such as Border Gateway Protocol (BGP) and ECMP. Externally, only IPV4/24, IPv6/48, or larger networks are reroutable via external public BGP. Internally, BGP can be used to split and shift traffic as required. GP routing may be used for redundancy and load distribution.

In some variants proxy gateway 506 includes one or more processors 513, memory 514, a cryptographic encryptor 515, a secret key 516, and mappings 517. In some variants proxy gateway 506 may be configured to perform encrypted redirection of authenticated client IP traffic. In some variants the routing of the client IP traffic to the resource 508 may be performed by processor 513 using instructions stored in the memory 514 of proxy gateway 506. In some variants cryptographic encryptor 515 combines the source client IP address, protocol, secret key 516, and a server IP address and port to create a cryptographic hash unique to the source.

In some variants cryptographic encryptor 515 uses hashing protocols to protect the destination IP address and port. The protocols used may include but are not limited to, SHA variants, CRC-32, and Murmur3. In some variants secret key 516 may also be referred to as a private key may be typically a long, randomly, or pseudo-randomly generated sequence of bits that cannot be easily guessed. A complex private key may be used to prevent attackers from guessing the key.

The cryptographic hash may be then mapped into existing IP packet addresses, ports, or payload bits. IPV4/24 address has eight bits of address and 16 bits of ports. When additional bits are required, and the client supports it, encrypted bits can be placed into other embedded payload protocols (like VLAN space, or VXLAN space) that can hold additional bits. The use of bit space in the subnet, plus the port, plus any additional agreed space reduces the probability (zero to minimal) of random traffic finding service. Additional checksums may be added if there is additional bit space to store them. Since each packet can be computed independently of all other packets, this solution scales linearly with processor cores.

Multiple mappings 517 can be created that allow different clients to connect with resource 508 via different redirect nodes 512. Multiple mappings 517 can exist for the same server/service. Multiple Mappings 517 can exist on the same network at the same time and each mapping may be defined by a different key, or applicable start-end validity times. Mappings 517 are created for each connection between a redirect node (i.e. routable public subnet address) and resource 508 for routing of IP traffic from the source. Mappings 517 may be created, modified, and deleted through a secured Application Programming Interface (API), and distributed to redirect nodes 512 in the IP subnet.

In some variants encrypted IP packets from the proxy gateway 506 are randomized using redirect node 512 in the IP subnet. The random IP subnet address and random port may be associated with a redirect node 512A.

In some variants multiple redirect nodes 512A, 512B . . . 512N (collectively referred to as redirect nodes 512) may be a real server, or can simply represent vCPUs and are implemented easily using hardware or low-level networking. Redirect nodes 512 may be configured to manage different public IP subnets, or different mappings 517 on the same IP subnet. In some variants redirect nodes 512 (software and hardware nodes) can share loads, with hardware available for larger attacks, and software available to handle small attacks. In an example, a single vCPU processes about 1 Mpps, and may be scalable linearly across vCMP cores. Ampere 80 vCPU on Equinix Metal has 50 Gbps of a network, up to 50 M pps (est), at $1800.00/month Single Achronix card processes up to 6×100 Gbps, up to 700M pps, at $25,000 per month Up to 4×Achronix VectorPath per 1 U, 42 U per rack=100 Tbps, 10 racks=1 Pctabit/s.

In some variants redirect nodes 512 includes the mappings 517. Mapping 517 may be received from proxy gateway 506 at all the redirect nodes. For case of explanation, IP packets received at redirect node 512A are described. At redirect node 512A, received IP packets are decrypted and the source are validated based on the protocol used for encryption and secret key 516. In addition to performing validation redirect nodes 512 may incorporate additional filters such as rate limiting or maintaining a whitelist and/or a blacklist.

In some variants during operation, redirect nodes 512 are configured to decrypt and determine the IP address of each resource 508 and its port from the encrypted IP packets, or specified in the mapping 517. Mapping 517 may have a server IP/port, in which case no data bits are required. However, we can reserve some bits for incremental IP addresses or ports. For example, mapping 517 may state that resource 508 is 10.1.2.3, and mapping 517 may state that last two bits are for incrementing, then they would not store the encrypted randomized value, not be checked, but just used for accessing server 10.1.2.4/5/6/7, same for ports, if the default port is 443 in the mapping, then two bits reserved for incremental ports would decode to ports 444/445/446/447. Mapping 517 may further include an 'gateway IP' that resource 508 may use to reply, or send outbound packets. This allows reverse mapping of outgoing packets.

Redirect node 512 may be configured to route the IP traffic to the resource 508 by mapping the client IP packets to an internal client IP address and port associated with resource 508. Traffic may be tunneled via the internal client IP address and port to resource 508 via the mapping of the internal client IP/port to the client public IP/port.

In some variants redirect node 512 may be implemented on a Network Interface Card (NIC), Data Processing unit (DPU), Network Processing Unit (NPU), FPGA, or CPU. Further, implementation on CPU can be done at low level such as eBPF on XDP, before traffic reaches the OS. Also, this protocol is self-contained so it can be implemented directly on firewall and other network security appliances, including P4 or NPL programmable switch logic.

In some variants resource 508 may comprise a server that is hosting the protected services. resource 508 may not be directly accessible to sources except through redirection via redirect nodes 512 in the IP subnet. As resource 508 is hidden via a random cryptographic location in public IP subnets, it provides additional protection from random DDOS traffic immediately. Sources have no public access to the resource 508.

During operation, any requests for non-existent services, IP addresses, or ports are flagged/logged by redirect nodes 512. In some cases, the source may be flagged for inappropriate access and the customer account may be disabled/redirected. Any attacks to the mapped IP/port of a redirect node are tied to a source, so it may be harder to hide. Further, these violations may be reported to authentication mechanism to limit/prevent additional authentications, and redirects.

In some variants redirect nodes 512 can support both stateless and stateful configurations. The stateless configuration benefits from scalability, and the stateful configuration is useful for fine-grained protection. Mappings are for all connections between an external subnet and the resource 508.

Mappings 517 maintained by redirected nodes 512 that support stateless configuration may be referred to as stateless mapping. Stateless configuration allows traffic to be spread across multiple redirect nodes 512. When the processing is stateless, no reconnection is required, subnet addressing is used to map the IP traffic to redirect nodes 512, and then IP traffic may be routed to a service node (e.g. a network-connected resource 508). A service admin may provision different mappings 517 and rotate through the mappings to ensure that previous sources are disconnected. The use of multiple overlapping mappings on the same IP subnet ensures that previous connections are reset. Further, stateless mapping can be rotated to invalidate any abusers including preset, and/or overlapping mappings in the same space.

Using stateless configuration, there may be a single entry per client, irrespective of number of clients. Hence, the IP subnetting-based solution can be scaled infinitely to terabits, petabits, exabits, and beyond when combined with BGP and EMCP. In the case of stateless mapping, a redirect node may also be withdrawn in case of failure or overload. The impacted traffic received at the withdrawn node may be rerouted and serviced by a different redirect node in the IP subnet.

In the case of stateful configuration, IP traffic from clients is still pushed out to multiple stateless redirect nodes 512. This stateful mapping/implementation may be targeted at online gaming/gambling/financial services. Since users must pass the stateless check, the traffic tunneled to the stateful server 514 should not include random traffic, and excessive or abusive traffic can be eliminated by adding a blacklist before performing stateful operations.

At the redirect node 512, IP packets that do not pass the hash check are filtered, but IP packets that pass the hash test are tunneled to a central single stateful server 514. Stateful server 514 records the client IP address and port before routing the IP traffic to an intended resource 508. The stateful server 514 may be configured directly by the service admin using an API. The service admin can 'create' secure 'rooms' or 'bubbles'.

When the first IP packet 1017As arrive, optionally, the client port may be recorded and lock that client to that slot or seat. If the client is eliminated, the service admin can eliminate that client's IP (and port) from the 'room', and then the client has no network access to the room. The client still has the valid IP/port for the duration of the mapping, which will allow those packets to traverse the edge nodes, but they will be dropped on the stateful server 514 before interfering with the remaining active clients in the room. The service admin can remove a client from a room, or delete a room with an API call. The advantage is that the mapping that is pushed to all the edge nodes does not change. In an example, a service admin was operating an online poker game, the 'room' would be created by API, clients' IPs would be added by API, and the clients redirected to the mapping public IP subnet.

In addition to gaming and financial servers, the use of IP subnet-based addressing (redirect nodes 512) may be used for OpenVPN using which customers are connecting to corporate networks, this allows the actual ingress to the corporate network to be harder to locate and attack. This also allows customers who may be struggling with unique IP addresses to repurpose thousands more devices into legacy IP address space.

Figure 6:
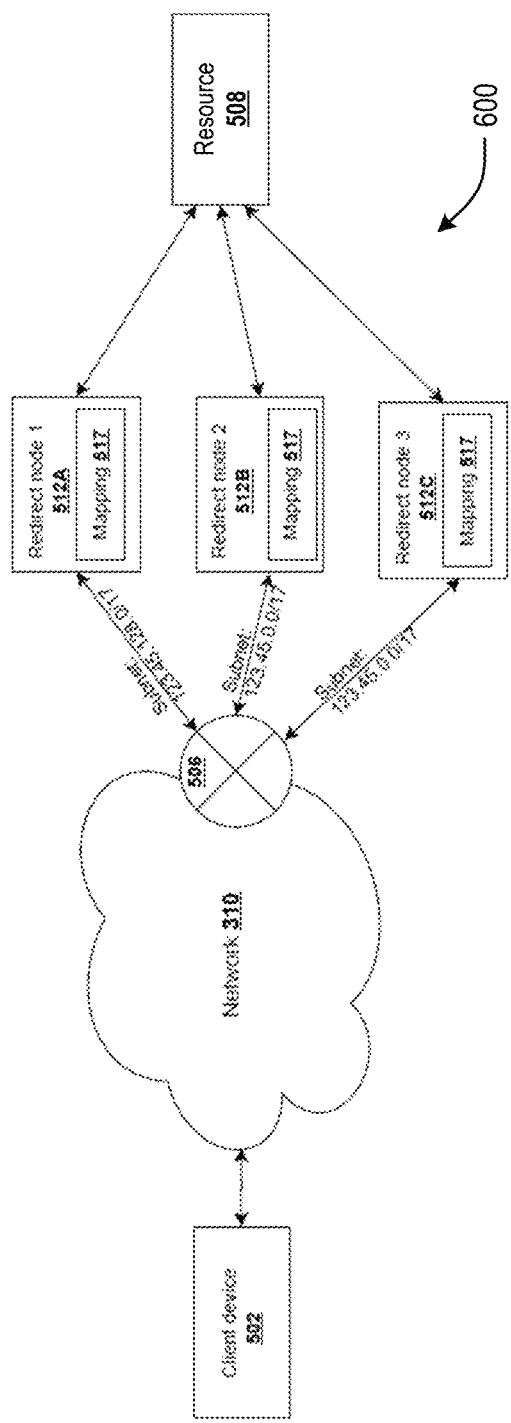
FIG. 6 is an example block diagram of a system that interfaces with one or more IP networks in which a proxy gateway 506 redirects IP traffic from a source to a resource using IP subnet addressing, according to one or more technologies described herein, optionally configured to interact with or instantiate the systems of FIG. 3 or 5 (or both).

FIG. 6 is an example block diagram of a system 600 that interfaces with one or more IP networks 310 in which a proxy gateway 506 redirects IP traffic from a the source to a resource 508 using IP subnet addressing, according to one or more technologies described herein, optionally configured to interact with or instantiate the systems of FIG. 3 or 5 (or both). Proxy gateway 506 is used for announcing the IP subnet 123.45.0.0/16. When the public subnet is IPV4: 123.45.0.0/16, there are 16 IP bits and 16 UDP/TCP port bits to utilize. IPV4 offers limited bit space, however, with IPV6,/48 networks can be announced, which allows 80 bits in IPV6 space, plus those 16 bits in UDP/TCP port space. Hence, it would be possible to use 8 bits, and provision a mapping to ISP1, use another 8 bits and provision to ISP2, and so on, and still use remainder for the end node.

Today, ISPs use FlowSpec to allow a customer to invoke RTBH, we can use the same mechanism to push the public IP of the mapping, plus all the mapping attributes. The ISP can then route traffic to their nodes to perform the filtering as per the mapping.

In FIG. 6, there are three redirect nodes 512A, 512B, and 512C. The first two redirect nodes 512A and 512B may be software nodes announcing IPV4/17 subnets and redirect node 512C may be a hardware node announcing IPV4/16 subnets. This type of IP subnet addressing may allow half of the random traffic to go to redirect node 512A and the other half of random traffic may flow to redirect node 512B. The third redirect node 512C does not process random IP traffic usually. During operation, if either of the redirect nodes 512A and 512B fails or is overwhelmed, then traffic may be routed by proxy gateway 506 to the hardware node 512C. In some cases, the software nodes may simply stop announcing their IP subnets and the traffic falls back to the hardware node.

Further, at any given instance additional redirect nodes 512 may be created and assigned with different subnets. In some cases, a single redirect node 512A may be configured to process IP traffic associated with a single IP address. For example, IP packets for resource 508 may be routed via redirect node 512A. The use of multiple redirect nodes 512 provides inherent balancing.

Exemplary Embodiments

Figure 7:
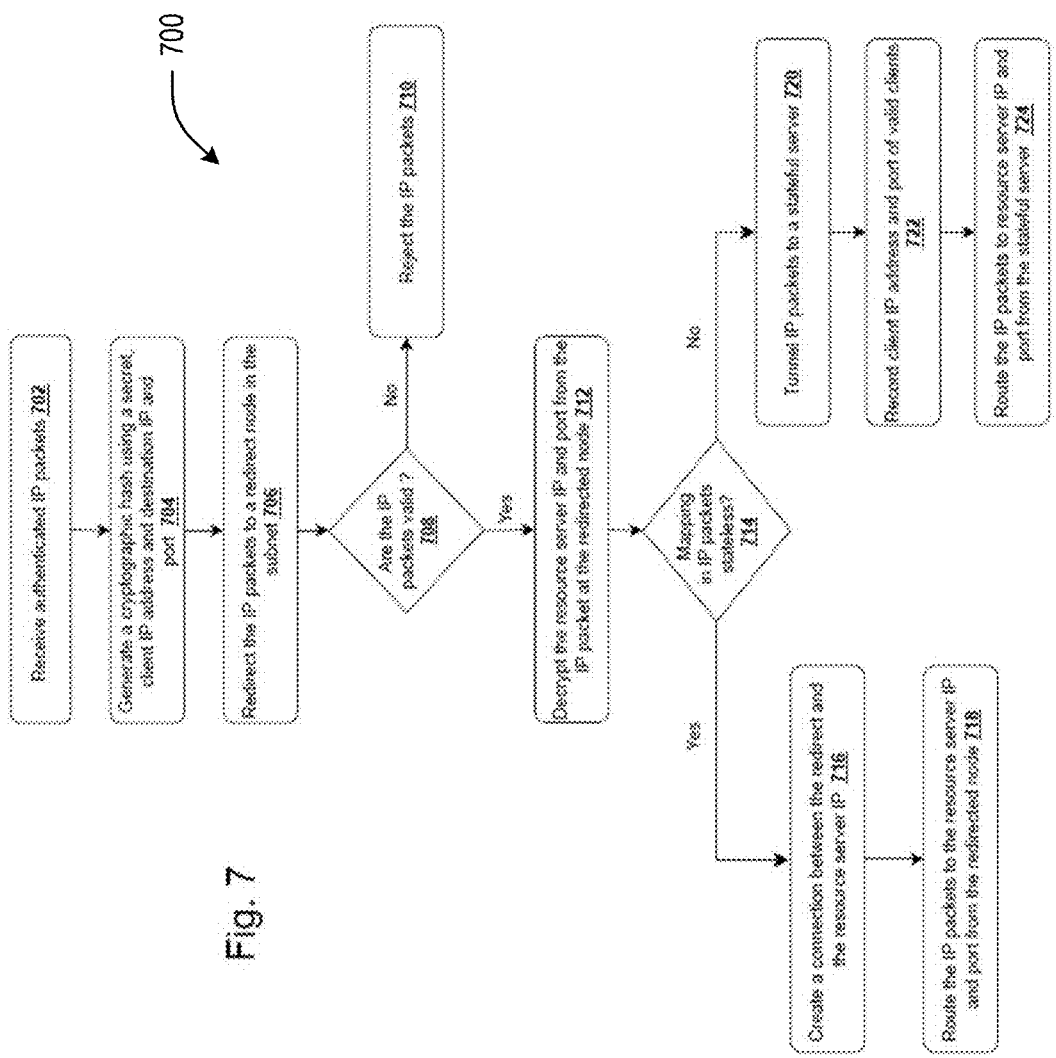
FIG. 7 is a flow diagram illustrating a method for encrypted redirection of IP traffic from clients in public IP subnets, according to one or more technologies described herein.

FIG. 7 is a flow diagram illustrating method 700 for encrypted redirection of IP traffic from clients in public IP subnets, in accordance with a preferred embodiment of the invention. In some variants steps of method 700 may be performed by redirect node 512 in the IP subnet of proxy gateway 506.

At step 702, proxy gateway 506 receives IP packets redirected by CDN server 510 after authentication of the source. CDNs improve server performance by using a distributed network of servers to deliver service availability to users. Because CDNs reduce server load, they reduce server costs and are well-suited to handling traffic spikes. For example, all the static content for a banking web page can be distributed by CDN. Only after executing the login and redirect can the user interact with banking APIs. Those APIs exist on the resource 508 behind the proxy gateway 506.

For IP traffic directed towards a resource 508, the source may be redirected to a secure network (CDN) from a public web server, using the standard DNS server 504. CDN server 510 may authenticate the source using tokens, cookies, auth exchange, and client certificates. During operation, successful authentication results in the redirection of IP packets from the source to proxy gateway 506.

At step 704, proxy gateway 506 may generate a cryptographic hash by encrypting the IP packets using a secret, protocol, client IP address, and resource IP address and port, wherein the cryptographic hash may be mapped into existing IP packet address, port, or payload bits. This mapping of the cryptographic hash (unique to the client) with encryption of resource 508.

It is important to identify which bits go where in the mapping. For example, if the public subnet is IPV4: 123.45.0.0/16, there are 16 IP bits and 16 UDP/TCP port bits to utilize. A mapping for the first 8 bits of that space, or 123.45.ZZ.00/16, and another for the second eight bits 123.45.00.XX and mapping may also be present in the 16-bit port number XXXX. Redirect node 512 may extract the correct bits for a server IP address and port number based on the mapping. In some variants a first mapping 123.45.ZZ.00 may be provisioned to ISPs, with a longer duration (say 2-10 days), and the second mapping 123.45.00.XX may be provisioned to ISP with a shorter duration (hours). This way, an ISP can filter the traffic based only on the 8 ZZ or 8 XX bits.

At step 706, the IP packets are redirected to an IP subnet of the proxy server 506. In an example, the IP packets route the IP packets to redirect node 512B (IP subnet 123.45.0.0/17). For case of explanation redirect node 512B may be considered as an example of an external IP subnet address that routes the IP traffic.

At step 708, redirect node 512 may determine if the IP packets are valid. The cryptographic graphic hash may be unique to the source IP address of the source. When the IP packets are not from the source IP address present in the mapping, then at step 710, the IP packets are considered attackers and the IP packets are rejected. For example, if a bot were instructed to attack that 123.45.54.202 port 3674, from any other source IP address, it would be rejected. When responding to traffic that would be blocked, in addition to the rejection of the IP packets, logging or reporting may be also performed. For example, if an attacker can send TCP SYN packets, these would be dropped by a typical server without a service on that TCP port, and the redirect node 512 may respond with a SYN/ACK, telling the attacker that the port is unavailable. The benefit may be that the attacker cannot simply 'scan' TCP IP/ports until they get a response. If every IP/port responds, then they need to waste resources 508 performing a full TCP connection on every port. Any traffic that would be denied can be logged/reported, and then traffic redirected to a 'honeypot' where the attacker can interact with a decoy system designed to extract more information on the attack without reaching any production resources 508.

At step 712, redirect node 512B may decrypt the IP packets to determine a server IP address and port from the IP packet. Redirect node 512B may compare the server IP address and port extracted from the IP packet with information in the mapping 517.

At step 714, redirect node 512B may determine if the mapping in IP packets is stateless. In some variants redirect node 512B may support both stateless and stateful configurations. The stateless configuration benefits from scalability, and the stateful configuration may be useful for fine-grained protection. Mappings are for all connections between an external subnet (i.e. redirect node 512B) and the resource 508.

When the processing is stateless, no reconnection is required, and at step 716, an address translation may be performed based on the mapping data. Redirect node 512 may be configured to route the IP traffic to a server IP address and port by mapping the client IP to an internal client IP address and port associated with server or other resource 508. This address translation allows traffic from the source to be routed to resource 508 via the assignment of internal IP/port assigned to the source.

Redirect node 512 may be configured to route the IP traffic to the resource 508 by mapping the client IP packets to an internal IP address and port associated with resource 508. Traffic from the source may be tunneled to resource 508 via internal IP/port assigned to the client public IP/port.

Each address translation to route IP packets between redirect node 512B and resource 508 may be based on mapping 517 data. At step 718, IP packets are routed to the resource IP and port from the redirected node 512B.

When the processing is not stateless, then at step 720, IP traffic may be tunneled to a stateful server 514. Redirect node 512B redirects the IP traffic to the stateful server 514. Stateful server 514 may be configured directly by the service admin using an API. The service admin can 'create' secure 'rooms' or 'bubbles'.

At step 722, stateful server 514 records the client's IP address and port. At step 724, IP traffic may be routed to resource 508. When the first IP packet 1017As arrive, optionally, the client port may be recorded and lock that client to that slot or seat. If the client is eliminated, the service admin can eliminate that client's IP (and port) from the 'room', and then the client has no network access to the room. The client still has the valid IP/port for the duration of the mapping, which will allow those packets to traverse the redirect nodes 512, but they will be dropped at stateful server 514 before interfering with the remaining active clients in the room. The service admin can remove a client from a room, or delete a room with an API call. The advantage is that the mapping that is pushed to all the edge nodes does not change. In an example, a service admin was operating an online poker game, the 'room' would be created by API, clients' IPs would be added by API, and the clients redirected to the mapping public IP subnet. At step 724, IP packets are routed to the resource IP and port from stateful server 514.

In case of an attack at the proxy gateway 506 or redirect nodes, the connections between redirect node 512 and resource 508 are terminated. The source needs to be reauthenticated and a new mapping using a new secret is created.

Figure 8:
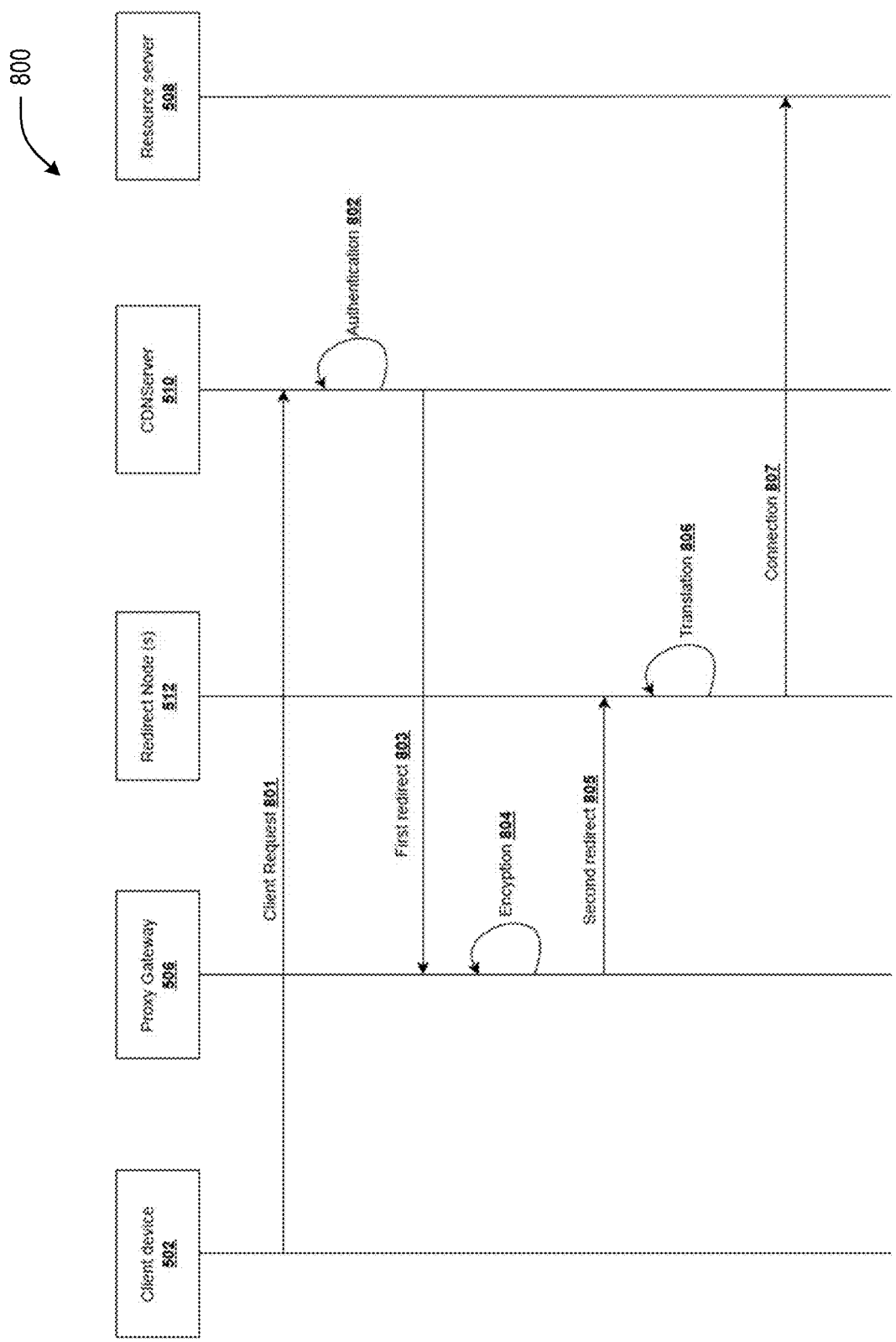
FIG. 8 is a sequence diagram illustrating the interaction between various components to redirect encrypted IP traffic to servers or other resources via IP subnets in a stateless mapping, according to one or more technologies described herein.

FIG. 8 is a sequence diagram 800 illustrating the interaction between various components in an IP network to redirect encrypted IP traffic to resource 508 via IP subnets, according to an embodiment of the invention. The components may include the source, proxy gateway 506, redirect nodes 512, CDN server 510, and resource 508.

The source transmits a client request 801 to the gateway. The client request 801 can e.g. be an HTTP request or a COAP request. The client request 801 may be a request to resource 508. Client request 801 comprises a first (unmodified) FQDN (Fully Qualified Domain Name) which may be a pointer to resource 508, e.g. www.facebook.com.

Client request 801 may be authenticated by CDN server 510. The source (e.g. a client device 502) may receive a CDN-based address to retrieve the landing page/authentication code at CDN server 510. CDN server 510 initiates the authentication 802 of the source. CDN server 510 may authenticate the source using tokens, cookies, auth exchange, and client certificates.

When the authentication operation 802 is successful the IP packets from the source are redirected to a proxy subnet 506. First redirection 803 may be performed when the client can be authenticated (TLS cert, cookie, etc.), this ensures that only authenticated users can get the encrypted redirection. This also allows client authentications to optionally be paused/halted/rate limited for clients associated with attack traffic.

Proxy gateway 506 generates a combinational cryptographic hash. An encryption protocol may be used to encrypt 804 IP packets using a secret, client IP address, and resource 508's IP address and port, wherein the cryptographic hash may be mapped into existing IP packet address, port, or payload bits. This cryptographic hash (unique to the client) includes a protocol and secret associated with the client and encrypted bits associated with resource 508 are present.

Once encrypted the IP packets are redirected for a second time to a redirect node 512 in the IP subnet of the proxy gateway 506. In the second redirect 805, the IP packets from proxy gateway 506 get redirected to a redirect node 512.

Redirect node 512 validates the source, and decrypts the secret and destination service IP address and port from the IP packets. Redirect node 512 may be configured to translate 806 the client IP address to an IP address and port associated with resource 508 based on information available in mapping 517. This address translation of the client public IP/port to an internal IP address and port associated with resource 508 helps in routing IP packets from the source to a resource IP/port via redirect node 512.

Example Client to Resource 508

Client IP is 73.217.224.180. resource 508 is www.facebook.com, and DNS server 504 resolves this to 157.240.18.35, or 2a03:2880:f127:283:face:b00c:0:25de. The client connects to these IPs, port 443, performs authentication, and gets redirected to the computed external server IP/port (redirect node 512). Assuming the secret is 0x01020304 (32 bits), Protocol is simple XOR (secret {circumflex over ( )}SRCIP{circumflex over ( )}(DESTIP+ DESTPORT) where {circumflex over ( )}=XOR and +=concatenation. designated random internal server IP/port: 10.02.02.02 port 32778 (+10), or 0x 0202020A, designated internal client IP/port: 4.45.01.01/1234, client: 73.217.224.180: port 12343.

External redirection server: 240.18.35 port 443, gets translated to a server of resource 508:34.45.74.217 port: 57786, using internal client IP 34.45.01.01 port 1234 (internally reachable response address for outbound traffic, assigned arbitrarily). The packet computation is (0x01020304{circumflex over ( )}49D9E0B4{circumflex over ( )}0x0202020A)=4AD9 E1BA, 16 bits for IP: 34.45. (0x4A). (0xD9) Port: 0xE1BA Example Client-to-Client Communication One additional feature is to enable end client-to-client communications while protecting the client's public IP address. In gaming servers today, most lounge/chat-type features use the client's public IP address. In this case, each seat can be assigned a random value of length equal to or less than the available bits in the mapping.

When the first client wants to talk to a second client, the service can provide the second client with an IP address that is within the public subnet, but XORs in the first client and second client. So, the first client may have public IP 1.2.3.4, second client may have public IP 4.3.2.1. First client 1 may receive a mapping of 123.45.66.77 port 8899, and the second client may receive a mapping of 123.45.88.99 port 3344. These clients use those IP/port to access the server. Assuming we assign a random 8-bit value to first client (0×55) and a random 8-bit value to second client (0×29), then we select an 8-bit value of the mapping that we will ignore on the edge (say the highest 8 bits), and we can XOR the first client and the second client byte values with that bit, and provide that as the public IP/port for that one client to reach that one other client. Since the hash computed is based on the client's source IP, the value is different for each client, but when the hash is computed, the correct value for that byte is again XORed with the source client's byte, and the result is the byte of the client they want to connect with. Granted, this only provides one byte of protection, but any attempt to access any other value could be flagged on the first access, and the packets can be discarded, or the client can be disconnected.

Figure 9:
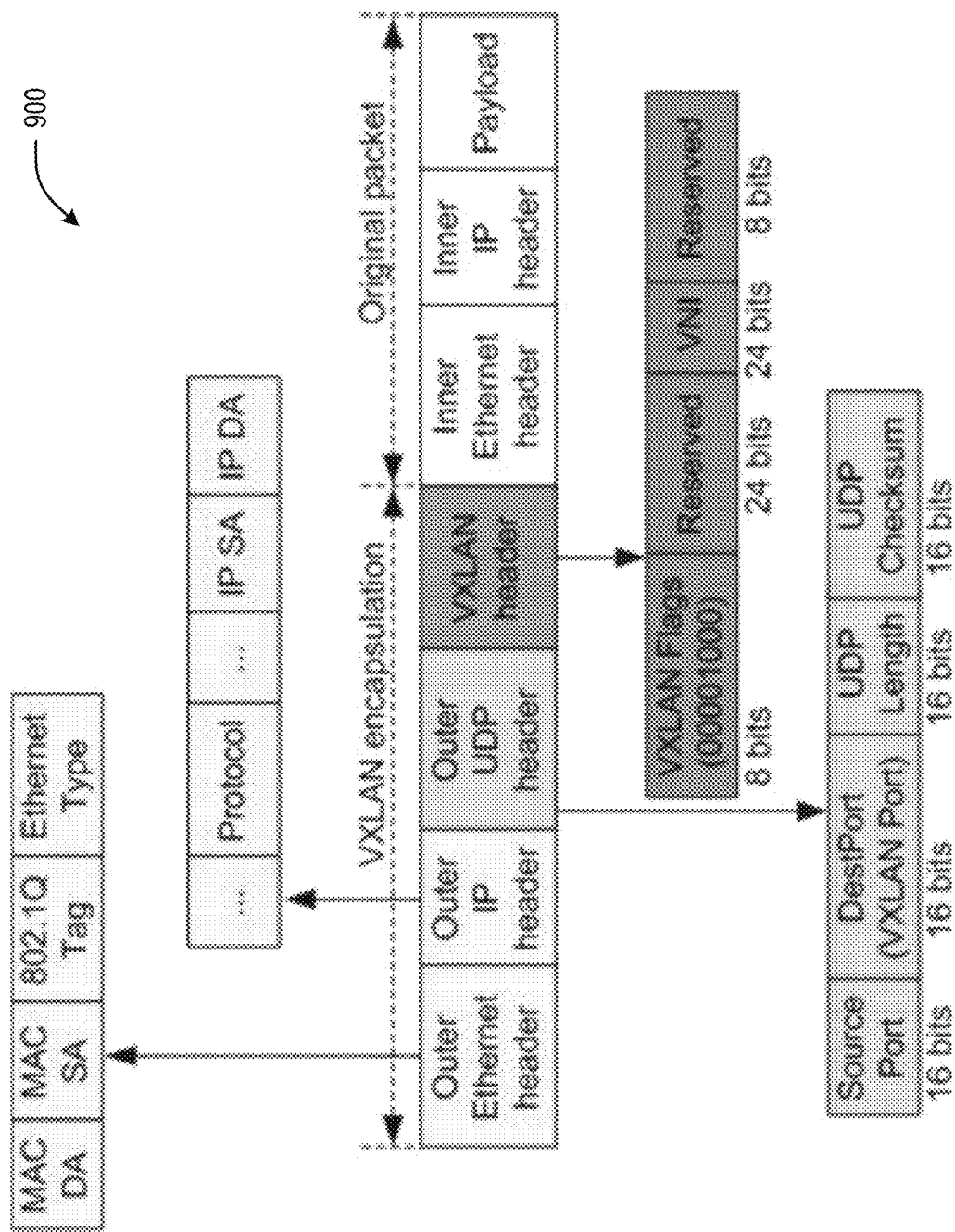
FIG. 9 illustrates an exemplary IP network for extending the encoding bit space available, according to one or more technologies described herein.

FIG. 9 illustrates an exemplary IP network for extending the encoding bit space available, according to an embodiment of the present invention. IPV4/24 address has eight bits of address and 16 bits of ports. When additional bits are required, and the client supports it, encrypted bits can be placed into other payload protocols (like VLAN space, or VXLAN space). In cases where the client network does not have enough bits in the IP network and port bits, it may be possible to utilize additional bits in what is typically the payload of the TCP or UDP packet. An example would be to tag the traffic as VXLAN or VLAN and use those additional bits to store the encrypted value. In this case, the outer IP/UDP headers are the same, but the entire VXLAN header can be used to store encrypted bits. So, the packet is marked as VXLAN, and the encrypted value is mapped into the DEST IP, DEST PORT, and VXLAN 64 bits. When the packet is translated, the VXLAN information is removed, and a simple UDP connection is created internally. Any protocol contained in the UDP packets can be used. As many subsequent bytes as required may be used.

Figure 10:
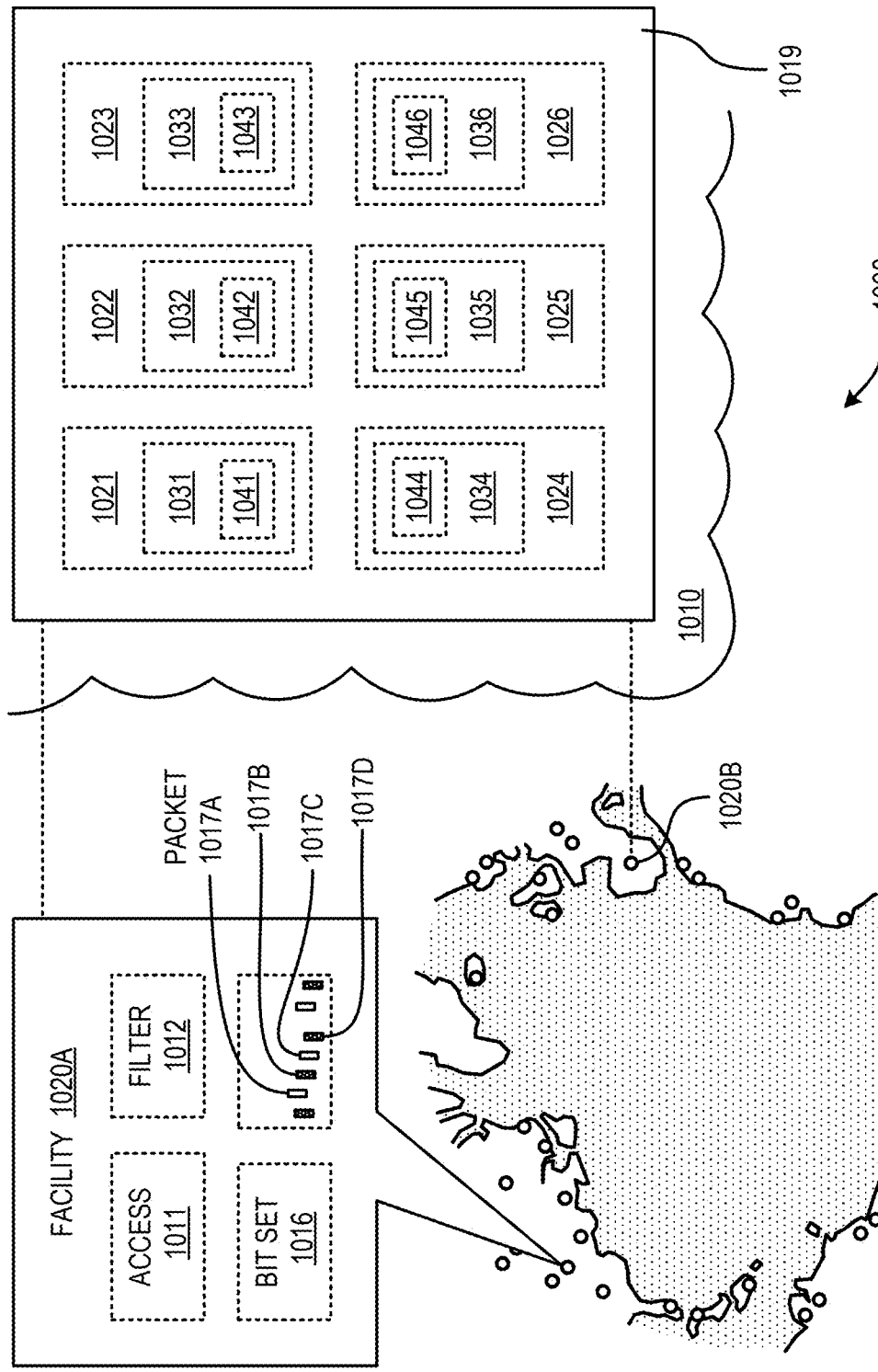
FIG. 10 illustrates one or more systems that interact with one or more remote facilities via one or more networks that can connect with one or more resources protected according to one or more technologies described herein, optionally configured to interact with or instantiate a system of FIG. 3, 5, or 6.

FIG. 10 illustrates one or more systems 1000 that interact with many mutually remote facilities 1020 via one or more networks 310, 1010 connected with one or more resources 508 protected according to one or more technologies described herein. In some variants each device or other facility 1020 may include one or more instances of accesses 1011, of filters 1012, of bit sets 1016 relating to each packet 1017A-D, of hash result components suitable for "stuffing" such bit sets 1016, or of other operating parameters as described herein.

Various instances of system 1000 as shown, for example, can interact with or implement an above-described system 200, 300, 400, 600. Two facilities 1020A-B as shown may interact via cloud-based event-sequencing circuitry 1019 in one or more networks 310, 1010 spanning the Atlantic Ocean, either or both of which manages (an instance of) a vulnerable resource 508 as described herein. Such circuitry 1019 may comprise one or more integrated circuits (ICs), for example, optionally mounted on one or more circuit boards that implementing an event-sequencing structure as generally described in U.S. Pat. Pub. No. 2015/0094046 but configured as described herein. Transistor-based circuitry 1019 may (optionally) include one or more instances of implementation modules 1021 configured for local or other processing, for example, (each) including an electrical node set 1031 upon which informational data is represented digitally as a corresponding voltage configuration 1041. Transistor-based circuitry 1019 may likewise include one or more instances of filtering modules 1022 configured for local or other processing, for example, including an electrical node set 1032 upon which informational data is represented digitally as a corresponding voltage configuration 1042. Transistor-based circuitry 1019 may likewise include one or more instances of hashing modules 1023 configured for local or other processing, for example, including an electrical node set 1033 upon which informational data is represented digitally as a corresponding voltage configuration 1043. Transistor-based circuitry 1019 may (optionally) likewise include one or more instances of linking modules 1024 configured for local or other processing, for example, including an electrical node set 1034 upon which informational data is represented digitally as a corresponding voltage configuration 1044. Transistor-based circuitry 1019 may likewise include one or more instances of forwarding modules 1025 configured for local or other processing, for example, including an electrical node set 1035 upon which informational data is represented digitally as a corresponding voltage configuration 1045. Transistor-based circuitry 1019 may likewise include one or more instances of dissemination modules 1026 configured for local or other processing, for example, including an electrical node set 1036 upon which informational data is represented digitally as a corresponding voltage configuration 1046.

Referring again to FIGS. 1-10, protocols are presented herein for protecting resource availability. In some variants transistor-based circuitry (e.g. one or more linking modules 1034) is remotely or otherwise invoked for established a first mapping that associates at least a first (service, application, website, server, repository, or other) resource 508 with network traffic (directly addressed to or otherwise) destined to a first IP subnet (see FIG. 6). Transistor-based circuitry (e.g. one or more implementation modules 1031) is likewise invoked for causing a first proxy gateway 506 to receive a first IP packet 1017A of the network traffic from a first source destined to the first IP subnet. Transistor-based circuitry (e.g. one or more hashing modules 1033) is remotely or otherwise invoked for causing a first hash result to be generated by encrypting or otherwise transforming a first digital identifier of the first source (e.g. of a client device 502) wherein one or more bits of the first hash result are effectively compared with a bit set of the first IP packet 1017A. Transistor-based circuitry (e.g. one or more filtering modules 1032) may likewise be invoked so as to cause the first proxy gateway 506 to respond conditionally to (a determination of) the one or more bits of the first hash result matching with the bit set of the first IP packet 1017A by giving the first IP packet 1017A a selective first access to the first resource 508. Alternatively or additionally, transistor-based circuitry (e.g. one or more forwarding modules 1035) may cause an implementation of the selective first access by modifying at least part of the bit set of the first IP packet 1017A whereby the first IP packet 1017A is redirected to the first resource 508.

Although various operational flows are described in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

Clause 1. A method for protecting resource availability, the method comprising: establishing, by first transistor-based circuitry (e.g. one or more linking modules 1034), a first mapping that associates at least a first (service, application, website, server, repository, or other) resource 508 with network traffic (directly addressed to or otherwise) destined to a first IP subnet (see FIG. 6);

causing, by second transistor-based circuitry (e.g. one or more implementation modules 1031), a first proxy gateway 506 to receive a first IP packet 1017A of the network traffic from a first source (e.g. a client device 502 or CDN 510) destined to the first IP subnet;

causing, by third transistor-based circuitry (e.g. one or more hashing modules 1033), a first hash result to be generated by encrypting or otherwise transforming a first digital identifier of the first source (e.g. one or more packet transmitters) wherein one or more bits of the first hash result are (directly or otherwise effectively) compared with a bit set of the first IP packet 1017A; and causing, by fourth transistor-based circuitry (e.g. one or more filtering modules 1032), the first proxy gateway 506 to respond conditionally to (a determination of) the one or more bits of the first hash result matching with the bit set of the first IP packet 1017A by giving the first IP packet 1017A a selective first access to the first resource 508.

Clause 2. The method of any of the above clauses comprising:

causing, by fifth transistor-based circuitry (e.g. one or more forwarding modules 1035), an implementation of the selective first access by modifying at least part of the bit set of the first IP packet 1017A wherein the first IP packet 1017A is proxied to an internal IP address or to an internal port (or to both) whereby the first IP packet 1017A is redirected to the first resource 508.

Clause 3. The method of any of the above clauses wherein the first access is "selective" at least insofar that one or more other packets 1017 of network traffic are not given such access.

Clause 4. The method of any of the above clauses wherein the first proxy gateway 506 proxies the first IP packet 1017A to the first resource 508 only after validating the first IP packet 1017A of the network traffic.

Clause 5. The method of any of the above clauses whereby the first resource 508 becomes safer from a DDOS attack or other resource access problem (or both).

Clause 6. The method of any of the above clauses comprising:

causing the first mapping to be distributed, by other transistor-based circuitry (e.g. one or more dissemination modules 1036), to numerous other proxy gateways 506 in whereby the first resource becomes more broadly accessible while still being protected from a Distributed Denial of Service attack.

Clause 7. The method of any of the above clauses wherein more than 10% of (the bits of) the first hash result is installed into a bit set of the first IP packet 1017A.

Clause 8. The method of any of the above clauses wherein more than half of the first hash result is installed into a bit set of the first IP packet 1017A.

Clause 9. The method of any of the above clauses wherein more than 20% of the first hash result is installed into a bit set of the first IP packet 1017A.

Clause 10. The method of any of the above clauses wherein the first mapping contains all the steps used in extracting bits from the first hash result and thereby to populate bits into a bit set of first IP packet 1017A.

Clause 11. The method of any of the above clauses wherein a first mapping that is shared by the first redirect protocol and the first proxy gateway 506 comprises processing the first hash result into a bit set of the first IP packet 1017A by a programmatic modification of one or more bits from the first hash result into a first bit set and installing several bits of the first bit set into the first IP packet 1017A.

Clause 12. The method of any of the above clauses wherein a first mapping that is shared by the first redirect protocol and the first proxy gateway 506 comprises processing the first hash result into the bit set of the first IP packet 1017A so that a bit length of the first hash result differs from a bit length of the bit set and installing all bits of the bit set into the first IP packet 1017A.

Clause 13. The method of any of the above clauses wherein a first mapping that is shared by the first redirect protocol and the first proxy gateway 506 comprises processing the first hash result into the bit set of the first IP packet 1017A so that a bit length of the first hash result differs from a bit length of the bit set and installing some bits of the bit set into the first IP packet repeatedly.

Clause 14. The method of any of the above clauses wherein a first mapping that is shared by the first redirect protocol and the first proxy gateway 506 comprises processing the first hash result into the bit set of the first IP packet 1017A so that a bit length of the first hash result exceeds a bit length of the bit set and installing all bits of the bit set into the first IP packet.

Clause 15. The method of any of the above clauses wherein a first mapping that is shared by the first redirect protocol and the first proxy gateway 506 comprises processing the first hash result into the bit set of the first IP packet 1017A by a programmatic selection of the first hash result that excludes at least 2 bits of the first hash result and installing all bits of the bit set into the first IP packet.

Clause 16. The method of any of the above clauses wherein the bit set comprises one or more available port bits and one or more available IP packet address bits (and perhaps others).

Clause 17. The method of any of the above clauses wherein the bit set comprises one or more available IP packet address bits and one or more known-offset payload bits.

Clause 18. The method of any of the above clauses wherein the bit set comprises one or more available port bits and one or more known-offset payload bits.

Clause 19. The method of any of the above clauses whereby a first Distributed Denial of Service (DDOS) attack that comprises the other risk causes very numerous (i.e. millions or more) illegitimate network packets to target the first resource within a period of less than ten seconds wherein the first DDOS attack is rendered ineffectual insofar that more than half of the very numerous illegitimate network packets are not routed by the first redirect protocol being used in the first IP subnet announced by the first proxy gateway 506.

Clause 20. The method of any of the above clauses whereby a first Distributed Denial of Service (DDOS) attack that comprises the other risk causes numerous (i.e. hundreds or more) illegitimate network packets to target the first resource within a period of less than ten seconds wherein the first DDOS attack is rendered ineffectual (at least) insofar that more than 1% of the numerous illegitimate network packets are not routed by the first redirect protocol being used in the first IP subnet announced by the first proxy gateway 506.

Clause 21. The method of any of the above clauses whereby a first Distributed Denial of Service (DDOS) attack that comprises the other risk causes very numerous illegitimate network packets to target the first resource within a period of less than ten seconds wherein the first DDOS attack is rendered ineffectual insofar that more than ten of the very numerous illegitimate network packets are not routed by the first redirect protocol being used in the first IP subnet announced by the first proxy gateway 506.

Clause 22. The method of any of the above clauses wherein the first redirect protocol is implemented as software that resides on a redirect node or on the first source.

Clause 23. The method of any of the above clauses 1 wherein the first redirect protocol comprises hypertext transfer protocol (HTTP) redirect code.

Clause 24. The method of any of the above clauses wherein the first source comprises a content delivery network server or a client device 502 (or both).

Clause 25. The method of any of the above clauses wherein the first mapping that is shared by the first redirect protocol and the first IP subnet announced by the first proxy gateway 506 also maps the first IP packet to the first resource.

Clause 26. The method of any of the above clauses comprising:
 causing an installation of the first hash result into two or more segments of the first IP packet that are not adjacent as the bit set.

Clause 27. The method of any of the above clauses wherein a port field (e.g. of a UDP or of a TCP protocol) of the first IP packet comprises several bits that do not identify a valid destination port of the first resource until a substitution protocol restores via a first mapping a valid port address of the first resource.

Clause 28. The method of any of the above clauses wherein an IP packet address field (e.g. of a UDP protocol or of a TCP protocol) of the first IP packet comprises several bits that do not identify a valid destination IP packet address of the first resource until a substitution protocol restores via a first mapping a valid first resource IP address Clause 29. The method of any of the above clauses wherein the first IP packet (e.g. of a VLAN protocol or of a VXLAN protocol) does not contain a valid destination IP packet address and port of the first resource until a substitution protocol restores via a first mapping a valid destination IP packet address and port of the first resource.

Clause 30. The method of any of the above clauses wherein the causing the first proxy gateway 506 having the public IP subnet to be configured between a first source as the first source and wherein the first resource 508 confirms that a server has authenticated the first source.

Clause 31. The method of any of the above clauses wherein the causing the first proxy gateway 506 having the public IP subnet to be configured between the first source and the first resource includes causing a first server to authenticate the first source.

Clause 32. The method of any of the above clauses wherein receiving the first and second IP packets from a first server and associated with the first source comprises:
 receiving the first and a second IP packets from the first source after the first source has been authenticated by a first server.

Clause 33. The method of any of the above clauses wherein the causing the first proxy gateway 506 to receive the first and second IP packets from a CDN or other server and associated with the first source comprises:

receiving the first and second IP packets from the first source after the first source has been authenticated by a first server.

Clause 34. The method of any of the above clauses wherein the first and a second IP packet 1017Bs are only routed upon a determination that the first cryptographic hash is valid.

Clause 35. The method of any of the above clauses wherein the proxy server thereby filters out some other packets that do not include a valid cryptographic hash and are therefore not redirected to the first resource and are thereby prevented from overloading the first resource.

Clause 36. The method of any of the above clauses wherein the first and second IP packet 1017Bs are thereby self-validated and redirected and wherein numerous other packets are not redirected.

Clause 37. The method of any of the above clauses wherein the first resource is thereafter protected by vetting the first source by validating the first cryptographic hash.

Clause 38. The method of any of the above clauses wherein the first resource is thereafter protected by flagging a risk relating to the first source by detecting a flaw in the first cryptographic hash.

Clause 39. The method of any of the above clauses wherein the first resource is thereafter protected by decrypting the first cryptographic hash before allowing the second IP packet 1017B to pass via a first redirect node.

Clause 40. The method of any of the above clauses wherein the first gateway checks a value against an incoming second IP packet 1017B and deems the incoming second IP packet 1017B invalid if one or more bits of a first hash result does not match a corresponding bit set of the incoming packet.

Clause 41. The method of any of the above clauses comprising:
  implementing a time-varying secret, first and second consecutive values of the time-varying secret being valid only for a limited interval of more than 40 milliseconds and less than 40 hours.

Clause 42. The method of any of the above clauses comprising:
  implementing a time-varying secret, first and second consecutive values of the time-varying secret being valid only for a limited interval of more than a second and less than a week.

Clause 43. The method of any of the above clauses comprising:
  causing the first mapping to be distributed, by other transistor-based circuitry (e.g. one or more dissemination modules 1036), to numerous proxy gateways 506 in one or more networks that include the first proxy gateway 506 whereby the first resource becomes more broadly accessible while still being protected from a Distributed Denial of Service attack.

Clause 44. The method of any of the above clauses wherein more than half of the first hash result is installed into the bit set of the first IP packet.

Clause 45. The method of any of the above clauses wherein 100% of the first hash result is installed into the bit set of the first IP packet.

Clause 46. The method of any of the above clauses wherein a first mapping is shared by the first redirect protocol and the first proxy gateway 506 and contains all steps used to extract bits from the first hash result and thereby to populate bits into a bit set of the first IP packet.

Clause 47. The method of any of the above clauses wherein a first mapping that is shared by the first redirect protocol and the first proxy gateway 506 comprises processing the first hash result into the bit set of the first IP packet 1017A by a programmatic modification of one or more bits from the first hash result into the bit set and installing all bits of the bit set into the first IP packet. wherein a first mapping that is shared by the first redirect protocol and the first proxy gateway 506 comprises processing the first hash result into the bit set of the first IP packet 1017A so that a bit length of the first hash result differs from a bit length of the bit set and installing all bits of the bit set into the first IP packet.

Clause 48. The method of any of the above clauses wherein a first mapping that is shared by the first redirect protocol and the first proxy gateway 506 comprises processing the first hash result into the bit set of the first IP packet 1017A so that a bit length of the first hash result differs from a bit length of the bit set and installing some bits of the bit set into the first IP packet repeatedly.

Clause 49. The method of any of the above clauses wherein a first mapping that is shared by the first redirect protocol and the first proxy gateway 506 comprises processing the first hash result into the bit set of the first IP packet 1017A so that a bit length of the first hash result exceeds a bit length of the bit set and installing all bits of the bit set into the first IP packet.

Clause 50. The method of any of the above clauses wherein a first mapping that is shared by the first redirect protocol and the first proxy gateway 506 comprises processing the first hash result into the bit set of the first IP packet 1017A by a programmatic selection of the first hash result that excludes at least 2 bits of the first hash result and installing all bits of the bit set into the first IP packet.

Clause 51. The method of any of the above clauses comprising:
  after an indication of a first attack (reauthenticating or otherwise) authenticating the first source and creating another new mapping using a new secret for the first source.

Clause 52. The method of any of the above clauses whereby the first resource 508 becomes safer from a DDOS attack that comprises millions or more of other IP packets.

Clause 53. The method of any of the above clauses wherein the first mapping is shared by first redirect protocol and the first proxy gateway 506.

Clause 54. The method of any of the above clauses wherein a programming instruction sequence when executed by a processor 113, 513 causes the processor 113, 513 to: determine if the mapping is stateful; responsive to determining that the mapping is stateful, tunnel the IP packets to a stateful server; and route the IP packets to the resource IP and port from the stateful server.

Clause 55. The method of any of the above clauses wherein a one or more processors 113, 513 are configured to decrypt numerous IP packets at a redirect node so as to validate the first source based on a cryptographic hash; and responsive to validation of the first source, determine the resource IP address and the port.

Clause 56. The method of any of the above clauses wherein the proxy gateway 506 creates, modifies, and deletes mapping using a secured API and distributes the mapping to the plurality of redirected nodes.

Clause 57. The method of any of the above clauses wherein the mapping supported by the redirect nodes comprises stateful and/or stateless.

Clause 58. The method of any of the above clauses wherein the secret and protocol used in the mappings are rotated or changed to invalidate attackers.

Clause 59. The method of any of the above clauses that comprises receiving, at a proxy gateway 506 between a first source and a resource 508, IP packets from a first server, wherein the IP packets are associated with the first source authenticated by the first server and the IP packets are redirected towards the proxy gateway 506.

Clause 60. The method of any of the above clauses wherein the proxy gateway 506 provides access to the resource 508 using public IP subnet addressing.

Clause 61. The method of any of the above clauses comprising:
generating a cryptographic hash by encrypting the IP packets using a secret, client IP address and resource IP address and port.

Clause 62. The method of any of the above clauses wherein a first cryptographic hash is mapped into available bits in an existing IP packet address, port, or payload bits.

Clause 63. The method of any of the above clauses comprising:
automatically routing the IP packets to the first redirect node among a plurality of redirect nodes in the public IP subnet of the proxy gateway 506 conditionally, in response to a determination that the first mapping is stateless.

Clause 64. The method of any of the above clauses wherein the first redirect node is configured to map clients public IP/port to an internal IP address and port associated with the resource 508 and to tunnel the IP packets from the redirect node to the resource 508 using the internal IP address and port.

Clause 65. The method of any of the above clauses comprising:
decrypting, at the first redirect node, one or more IP packets to validate a service-requesting first source based on a decrypted cryptographic or other hash; and
automatically determining the resource IP address and the port as a conditional response to a validation of the service-requesting first source.

Clause 66. The method of any of the above clauses wherein the first proxy gateway 506 creates, modifies, and deletes one or more mappings using a secured API and distributes the mapping to numerous redirected nodes.

Clause 67. The method of any of the above clauses wherein one or more mappings supported by numerous redirect nodes comprise one or more stateful mappings shared by the first proxy gateway 506 and one or more other redirect protocols.

Clause 68. The method of any of the above clauses wherein one or more mappings supported by numerous redirect nodes comprise one or more stateful mappings shared by the first redirect protocol and one or more other proxy gateways 506.

Clause 69. The method of any of the above clauses wherein one or more mappings supported by numerous redirect nodes comprise one or more stateless mappings.

Clause 70. The method of any of the above clauses wherein a secret and protocol used in one or more mappings are repeatedly rotated or changed to neutralize one or more attackers.

Clause 71. The method of any of the above clauses comprising:
automatically tunneling one or more IP packets to a first stateful server conditionally in response to a determination that a current mapping is stateful; and routing the IP packets to the resource IP address and port from the first stateful server.

Clause 72. The method of any of the above clauses comprising:
obtaining an indication of a first attack at a second proxy gateway 506,
automatically terminating a tunneling of IP traffic between a redirected server and the resource 508 as a conditional response to the indication of the first attack at the second proxy gateway 506.

Clause 73. The method of any of the above clauses comprising:
automatically terminating a tunneling of IP traffic between a redirected server and the resource 508 conditionally in response to an indication of a first attack at a second proxy gateway 506; and
authenticating the second source after the first attack and creating another new mapping using a second secret for the second source.

Clause 74. The method of any of the above clauses comprising:
automatically creating a new mapping using a first secret for a second source (immediately or otherwise) conditionally in response to an indication of a first attack at a second proxy gateway 506; and
after the first attack authenticating the second source and creating another new mapping using a second secret for the second source.

Clause 75. The method of any of the above clauses comprising:
after an indication of a second source having been authenticated and after a prior mapping using a prior secret for the second source, automatically creating a new mapping using a new secret for the second source or automatically terminating a tunneling of IP traffic between a redirected server and the resource 508 conditionally (at least partly) in response to an indication of a first attack at the first proxy gateway 506; and
after the indication of the first attack reauthenticating the second source and creating another new mapping using a new secret for the second source.

Clause 76. A system configured to perform at least one of the above methods configured and to establish most or all numbered features of a system 200 as shown in FIG. 2.

Clause 77. A system configured to perform at least one of the above methods configured and to establish most or all numbered features of a system 300 as shown in FIG. 3.

Clause 78. A system configured to perform at least one of the above methods configured and to establish most or all numbered features of a system 400 as shown in FIG. 4.

Clause 79. A system configured to perform at least one of the above methods configured and to establish most or all numbered features of a system 600 as shown in FIG. 6.

Clause 80. The computing system of any of the above system clauses wherein an instance of invocation and interface logic thereof (is included and) resides in one or more cloud-resident servers.

With respect to the numbered claims expressed below, those skilled in the art will appreciate that recited operations therein may generally be performed in any order. Also, although various operational flows are presented in sequence (s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Terms like "responsive to," "related to," or other such transitive, relational, or other connections do not generally exclude such variants, unless context dictates otherwise. Furthermore each claim below is intended to be given its least-restrictive interpretation that is reasonable to one skilled in the art.

What is claimed is:

1. A method for protecting resource availability, said method comprising:
   establishing, by first transistor-based circuitry, a first mapping that associates a first resource with network traffic destined to a public first IP subnet;
   causing, by second transistor-based circuitry, a stateless first proxy gateway to receive a first IP packet of said network traffic from a first IP packet source destined to said public first IP subnet and after validating said first IP packet of said network traffic destined to said public first IP subnet to proxy said first IP packet to said first resource;
   causing, by third transistor-based circuitry, a first hash result to be generated by encrypting or otherwise transforming a first digital identifier of said first IP packet source wherein one or more bits of said first hash result are directly or indirectly compared with a bit set of said first IP packet;
   causing, by fourth transistor-based circuitry, said stateless first proxy gateway to respond to said one or more bits of said first hash result matching with said bit set of said first IP packet by giving said first IP packet a selective first access to said first resource; and
   causing, by fifth transistor-based circuitry, an implementation of said selective first access by modifying at least part of said bit set of said first IP packet wherein said first IP packet as modified does not contain a valid destination IP packet address and port of said first resource until a substitution protocol restores via said first mapping a valid destination IP packet address and port of said first resource and whereby said first IP packet is redirected to said first resource.

2. The method of claim 1, wherein first mapping associates said first resource with said network traffic destined to said public first IP subnet was announced by a stateless first proxy gateway and
   wherein said causing said implementation of said selective first access is performed automatically.

3. The method of claim 1 comprising:
   automatically causing said first mapping to be distributed, by sixth transistor-based circuitry, to numerous proxy gateways in one or more networks that include said stateless first proxy gateway whereby said first resource becomes more broadly accessible while still being protected from a Distributed Denial of Service attack.

4. The method of claim 1 wherein said first mapping is shared by said first redirect protocol and said stateless first proxy gateway and comprises processing said cryptographic first hash result into said bit set of said first IP packet by a programmatic selection of said cryptographic first hash result that excludes at least 2 bits of said cryptographic first hash result and installing all bits of said bit set into said first IP packet and wherein said first redirect protocol is implemented as software that resides at least partly on a redirect node or on said first IP packet source.

5. The method of claim 1 comprising:
   automatically terminating a tunneling of IP traffic between a redirected server and said first resource conditionally in response to an indication of a first attack at a second proxy gateway; and
   authenticating a second IP packet source after said first attack and creating another new mapping using a second secret for said second IP packet source wherein said bit set comprises one or more available IP packet address bits and one or more known-offset payload bits.

6. The method of claim 1 comprising:
   flagging and redirecting said first IP packet source conditionally in response to an indication that a second IP packet from said first IP packet source fails validation.

7. The method of claim 1 wherein said first mapping that is shared by said first redirect protocol and said public first IP subnet announced by said stateless first proxy gateway also maps said first IP packet to said first resource and wherein more than 10% of said cryptographic first hash result is installed into a bit set of said first IP packet.

8. The method of claim 1 comprising:
   obtaining an indication of a first attack at said stateless first proxy gateway;
   obtaining an indication of a second IP packet source having been authenticated; and
   replacing said first mapping that is shared by said first redirect protocol and said public first IP subnet announced by said stateless first proxy gateway by creating a new mapping for said second IP packet source.

9. The method of claim 1 comprising:
   implementing a time-varying secret, first and second consecutive values of said time-varying secret each being valid for a respective limited interval of more than a second and less than a month wherein a first mapping is shared by said first redirect protocol and said stateless first proxy gateway comprises processing said cryptographic first hash result into said bit set of said first IP packet.

10. The method of claim 1 wherein a first mapping that is shared by said first redirect protocol and said stateless first proxy gateway comprises processing said cryptographic first hash result into a bit set of said first IP packet by a programmatic modification of one or more bits from said cryptographic first hash result into said first bit set and installing an inverted, divided, reversed, or other indication of several bits of said first bit set into said first IP packet.

11. The method of claim 1 wherein a first mapping that is shared by said first redirect protocol and said stateless first proxy gateway comprises processing said cryptographic first hash result into said bit set of said first IP packet so that a bit length of said cryptographic first hash result differs from a bit length of said bit set.

12. The method of claim 1 wherein a first mapping that is shared by said first redirect protocol and said stateless first proxy gateway comprises processing said cryptographic first hash result into said bit set of said first IP packet so that a bit length of said cryptographic first hash result exceeds a bit length of said bit set and installing all bits of said bit set into said first IP packet.

13. The method of claim 1 wherein said first mapping comprises processing said cryptographic first hash result into said bit set of said first IP packet by a programmatic selection of said cryptographic first hash result that excludes at least 2 bits of said cryptographic first hash result and encoding, reversing, inverting, or otherwise indicating all bits of said bit set into said first IP packet.

14. The method of claim 1 wherein a first Distributed Denial of Service (DDOS) attack causes numerous illegitimate network packets to target said first resource within a period of less than ten seconds and wherein said first DDOS attack is rendered ineffectual insofar that more than half of said numerous illegitimate network packets are not routed by said first redirect protocol being used in said public first IP subnet announced by said stateless first proxy gateway.

15. The method of claim 1 wherein an IP packet address field of said first IP packet comprises several bits that do not identify a valid destination IP packet address of said first resource until said substitution protocol substitutes hash result bits via said first mapping with a valid first resource IP address.

16. The method of claim 1 comprising:
causing said stateless first proxy gateway having said public first IP subnet to be configured between said first IP packet source and said first resource includes causing a first server to authenticate said first IP packet source wherein said first resource confirms that said first server has authenticated said first IP packet source.

17. The method of claim 1 wherein said first gateway checks a value against an incoming second IP packet and deems said incoming second IP packet invalid as a conditional response to an indication of one or more bits of said cryptographic first hash result not matching a corresponding bit set of said incoming second IP packet.

18. The method of claim 1 wherein said first hash result is a cryptographic hash result generated by encrypting (at least) a first secret and a first digital identifier of said first IP packet source;
wherein said stateless first proxy gateway responds conditionally to said one or more bits of said cryptographic fist hash result inversely or otherwise matching with said bit set of said first IP packet by giving said first IP packet a selective first access to said first resource;
wherein said bit set and said first subnet of said first IP packet are modified so as to implement a redirection of said first IP packet via a first redirect protocol into said public first IP subnet announced by said stateless first proxy gateway whereby said first IP packet is redirected to said first resource; and
wherein a new mapping is automatically created using a new secret for said first IP packet source in response to a DDOS attack having been detected.

19. A computer program product for protecting resource availability, said computer program product comprising:
one or more tangible, nonvolatile storage media; and
machine instructions borne on said one or more tangible, nonvolatile storage media which, when running on one or more computer systems, cause said one or more computer systems to perform a method comprising:
establishing, by first transistor-based circuitry, a first mapping that associates a first resource with network traffic destined to a public first IP subnet;
causing, by second transistor-based circuitry, a stateless first proxy gateway to receive a first IP packet of said network traffic from a first IP packet source destined to said public first IP subnet and after validating said first IP packet of said network traffic destined to said public first IP subnet to proxy said first IP packet to said first resource;
causing, by third transistor-based circuitry, a first hash result to be generated by encrypting or otherwise transforming a first digital identifier of said first IP packet source wherein one or more bits of said first hash result are directly or indirectly compared with a bit set of said first IP packet;
causing, by fourth transistor-based circuitry, said stateless first proxy gateway to respond to said one or more bits of said first hash result matching with said bit set of said first IP packet by giving said first IP packet a selective first access to said first resource; and
causing, by fifth transistor-based circuitry, an implementation of said selective first access by modifying at least part of said bit set of said first IP packet wherein said first IP packet as modified does not contain a valid destination IP packet address and port of said first resource until a substitution protocol restores via said first mapping a valid destination IP packet address and port of said first resource and whereby said first IP packet is redirected to said first resource.

20. A system for protecting resource availability, said system comprising:
first transistor-based circuitry configured to establish a first mapping that associates (at least) a first resource with network traffic destined to a public first IP subnet;
second transistor-based circuitry configured to cause a stateless first proxy gateway to receive a first IP packet of said network traffic from a first IP packet source destined to said public first IP subnet and after validating said first IP packet of said network traffic destined to said public first IP subnet to proxy said first IP packet to said first resource;
third transistor-based circuitry configured to cause a first hash result to be generated by encrypting or otherwise transforming a first digital identifier of said first IP packet source wherein one or more bits of said first hash result are directly or otherwise compared with a bit set of said first IP packet;
fourth transistor-based circuitry configured to cause said stateless first proxy gateway to respond to said one or more bits of said first hash result matching with said bit set of said first IP packet by giving said first IP packet a selective first access to said first resource; and
fifth transistor-based circuitry configured to cause an implementation of said selective first access by modifying at least part of said bit set of said first IP packet wherein said first IP packet as modified does not contain a valid destination IP packet address and port of said first resource until a substitution protocol restores via said first mapping a valid destination IP packet address and port of said first resource and whereby said first IP packet is redirected to said first resource.

* * * * *